US 010070028B2

(12) United States Patent
Leong et al.

(10) Patent No.: US 10,070,028 B2
(45) Date of Patent: Sep. 4, 2018

(54) OPTICAL SYSTEMS AND METHODS OF USE

(71) Applicant: Microsoft Technology Licensing, LLC, Redmond, WA (US)

(72) Inventors: Eric Mun Khai Leong, Kirkland, WA (US); Zhiqiang Liu, Redmond, WA (US); Ketan R. Shah, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/040,118

(22) Filed: Feb. 10, 2016

(65) Prior Publication Data

US 2017/0230550 A1    Aug. 10, 2017

(51) Int. Cl.
| H04N 5/225 | (2006.01) |
| G03B 17/12 | (2006.01) |
| G02B 7/00  | (2006.01) |

(52) U.S. Cl.
CPC .......... *H04N 5/2254* (2013.01); *G02B 7/004* (2013.01); *G03B 17/12* (2013.01); *H04N 5/2253* (2013.01); *H04N 5/2257* (2013.01)

(58) Field of Classification Search
CPC .. H04N 5/2254; H04N 5/2257; H04N 5/2253; G02B 7/004; G03B 17/12
See application file for complete search history.

(56) References Cited

U.S. PATENT DOCUMENTS

| 6,727,431 | B2 * | 4/2004 | Hashimoto | ....... H01L 27/14618 174/539 |
| 6,813,099 | B2 * | 11/2004 | Yamaguchi | .......... G02B 13/004 348/340 |
| 7,084,391 | B1 * | 8/2006 | Chen | ................. H01L 27/14618 250/208.1 |
| 7,680,408 | B2 * | 3/2010 | Chang | ..................... G02B 7/08 396/133 |
| 8,289,436 | B2 | 10/2012 | Strong | |
| 8,300,332 | B2 | 10/2012 | Campbell | |
| 8,308,379 | B2 | 11/2012 | Gooi et al. | |
| 8,376,555 | B2 | 2/2013 | Chen et al. | |
| 8,711,277 | B2 | 4/2014 | Apel | |

(Continued)

FOREIGN PATENT DOCUMENTS

WO    2015032512 A1    3/2015

OTHER PUBLICATIONS

"Camera Module Assembly Using Active Alignment Technology", Published on: Jun. 7, 2012 Available at: https://www.youtube.com/watch?v=WdpoDI0QKJ8.

(Continued)

*Primary Examiner* — Shahbaz Nazrul
(74) *Attorney, Agent, or Firm* — Ray Quinney & Nebeker, P.C.; Paul N. Taylor; Miia Sula

(57) ABSTRACT

An optical system with a base and an image sensor fixed to the base. The optical system includes a holder fixed to the base about the image sensor. The optical system includes a collar oriented about the image sensor and the holder. The optical system includes a lens barrel oriented about the image sensor, the holder, and the collar. The lens barrel includes at least one lens oriented therein. Two of the holder, collar, and lens barrel are threaded together.

20 Claims, 10 Drawing Sheets

(56) References Cited

U.S. PATENT DOCUMENTS

| | | | |
|---|---|---|---|
| 8,913,181 B2 | 12/2014 | Hsu | |
| 9,019,378 B2* | 4/2015 | Nakajima | G02B 7/021 348/148 |
| 9,106,819 B1 | 8/2015 | Gao et al. | |
| 2006/0181633 A1* | 8/2006 | Seo | H04N 5/2251 348/340 |
| 2006/0290802 A1* | 12/2006 | Webster | H04N 5/2253 348/340 |
| 2007/0063136 A1* | 3/2007 | Chiang | G02B 7/006 250/239 |
| 2007/0146534 A1* | 6/2007 | Kim | H01L 27/14618 348/340 |
| 2007/0196094 A1* | 8/2007 | Chiang | G02B 7/04 396/144 |
| 2008/0023808 A1* | 1/2008 | Wu | H01L 27/14618 257/678 |
| 2008/0252775 A1* | 10/2008 | Ryu | H04N 5/2253 348/374 |
| 2009/0033790 A1* | 2/2009 | Lin | G02B 7/023 348/374 |
| 2009/0109328 A1* | 4/2009 | Moon | H04N 5/2252 348/374 |
| 2009/0219433 A1* | 9/2009 | Higuchi | G02B 7/025 348/340 |
| 2009/0244728 A1* | 10/2009 | Tamoyama | G02B 7/02 359/819 |
| 2010/0141825 A1 | 6/2010 | Kim et al. | |
| 2011/0001862 A1* | 1/2011 | Chang | G02B 7/04 348/308 |
| 2011/0008038 A1 | 1/2011 | Halliday | |
| 2013/0100266 A1* | 4/2013 | Salsman | G06K 9/00221 348/77 |
| 2013/0329106 A1 | 12/2013 | Bigioi et al. | |
| 2013/0329126 A1* | 12/2013 | Brodie | G02B 7/023 348/360 |
| 2015/0124098 A1* | 5/2015 | Winden | H04N 5/2253 348/148 |
| 2015/0174715 A1 | 6/2015 | Kang | |
| 2015/0326766 A1* | 11/2015 | Czepowicz | H04N 5/2253 348/360 |
| 2016/0202443 A1* | 7/2016 | Knutsson | B60R 11/04 348/148 |

OTHER PUBLICATIONS

Roe, et al., "Vision System Assists Camera-Module Alignment", Published on: Apr. 1, 2007 Available at: http://www.vision-systems.com/articles/print/volume-12/issue-4/features/profile-in-industry-solutions/vision-system-assists-camera-module-alignment.html.

Alper, Gretchen, "Precise sensor mounting and alignment for sharp images in all conditions", Published on: Apr. 25, 2014 Available at: http://info.adimec.com/blogposts/bid/106414/Precise-sensor-mounting-and-alignment-for-sharp-images-in-all-conditions.

"International Search Report and Written Opinion Issued in PCT Application No. PCT/US2017/015925", dated Apr. 21, 2017, 13 Pages.

* cited by examiner

OPTICAL SYSTEMS AND METHODS OF USE

BACKGROUND

Background and Relevant Art

Many consumer products use cameras. Installing a camera in a consumer product may affect the quality of the images captured by the camera. Very high quality components require very little adjustment, but are often cost prohibitive for some consumer products. Expensive robotic devices have been used to align the components of the camera.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In at least one embodiment, an optical system is described. The optical system includes a base and an image sensor fixed to the base. A holder is fixed to the base about the image sensor. A collar is oriented about the image sensor and the holder. A lens barrel is oriented about the image sensor, the holder, and the collar. The lens barrel includes at least one lens oriented therein.

In at least one embodiment, the holder includes threads and the collar includes threads that mechanically attach to the threads of the holder. In some embodiments, the threads on the holder may be external threads and the threads on the collar may be internal threads. In further embodiments, the threads on the holder may be internal threads and the threads on the collar may be external threads.

In at least one embodiment, the collar includes threads and the lens barrel includes threads that mechanically attach to the threads of the collar. In some embodiments, the threads on the collar may be external threads and the threads on the lens barrel may be internal threads. In further embodiments, the threads on the collar may be internal threads and the threads on the lens barrel may be external threads.

In at least one embodiment, a camera module is described. The camera module includes a base and an image sensor fixed to the base. A holder is fixed to the base about the image sensor. A collar is oriented about the image sensor and the holder. A lens barrel is oriented about the image sensor, the holder, and the collar. The lens barrel includes at least one lens oriented therein. Two of the holder, the collar, and the lens barrel including threads to mechanically attach.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 5-1 is a cross-sectional, side view of the embodiment of an optical system shown in FIG. 5;

FIG. 6-1 is a cross-sectional, side view of the embodiment of an optical system shown in FIG. 6;

FIG. 7-1 is a cross-sectional, side view of the embodiment of an optical system shown in FIG. 7;

FIG. 8-1 is a cross-sectional, side view of the embodiment of an optical system 801 shown in FIG. 8.

DETAILED DESCRIPTION

Figure 1:
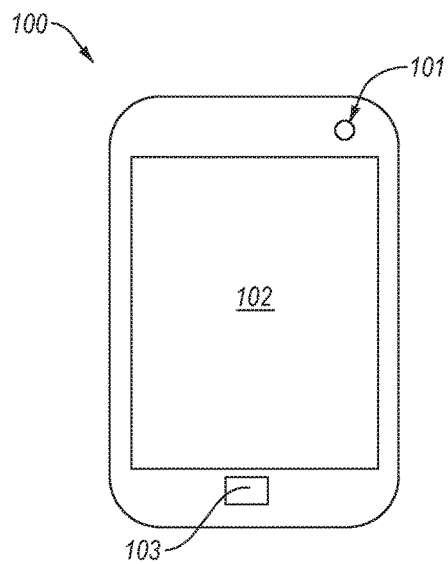
FIG. 1 is a conceptual drawing of an embodiment of a mobile device.

At least one embodiment disclosed herein is capable of adjusting spacing between a lens barrel and an image sensor in the z-direction. At least one embodiment disclosed herein is capable of adjusting the angular orientation (e.g., about $\theta_z$) between a lens barrel and an image sensor. At least one embodiment disclosed herein is capable of independently adjusting both spacing between a lens barrel and an image sensor in the z-direction and the angular orientation (e.g., about $\theta_z$) between a lens barrel and an image sensor.

Many cameras include an image sensor that is die-bonded and/or wire-bonded onto a printed circuit board assembly (PCBA). A holder may be mounted over the image sensor and attached to the PCBA. A lens barrel that includes at least one optical lens may be inserted into the holder.

In a perfect world the image sensor would be perfectly positioned such that it is perfectly flat on the PCBA. The holder would be perfectly oriented about the image sensor such that an image axis of the image sensor is perfectly aligned with a longitudinal axis of the holder. The holder would be perfectly manufactured such that its inner aperture is perfectly formed and aligned about the longitudinal axis of the holder. The barrel would be perfectly manufactured such that it fit perfectly into the holder. Each lens in the lens barrel would be perfectly manufactured with an optical axis that is perfectly aligned with a longitudinal axis of the lens barrel. Thus, the image axis of the image sensor would be perfectly aligned with the optical axis of the lens barrel. However, perfect or near-perfect components either do not exist or are very expensive.

Precision alignment systems are available that may assist in aligning the lens barrel within the holder relative to the image sensor. For example, an active alignment system may provide adjustments in, for example, five axes (e.g., x, y, z, $\theta_x$, and $\theta_y$). Such precision may mitigate components that are not perfect or near-perfect. However, like the perfect or near-perfect components, precision alignment systems are also very expensive. Clearly the best quality cameras would incorporate both perfect or near-perfect components and precision alignment systems, but this would be extremely expensive. In some consumer products, near-perfect image quality is not necessary. Thus, other components may be used.

However, with imperfect components the optical system may need to be focused. For example, the spacing between the lens barrel and the image sensor may need to be adjusted. Thus, it may be desirable to be able to adjust the spacing between the lens barrel and the image sensor in the z-direction. Adjusting the spacing may focus the optical system such that the lens barrel is focused in the middle of the image plane of the imaging sensor.

In another example, the optical axis (e.g., an axis perpendicular to a lens image plane) of the lens barrel may not be aligned with a longitudinal axis of the lens barrel. For instance, the concentricity of the optical axis to the mechanical axis of the barrel threads may be affected by the various optical lens elements and surfaces tolerances and mechanical tolerances. In another example, typical image sensors generally have an inherent tilt (e.g., are not perfectly parallel) to the PCBA due to, for example, manufacturing tolerances with the image sensor die and/or tolerances of the sensor package die-bond to the PCBA, which may affect the image axis of the image sensor. As the lens barrel is threaded into the holder, the orientation of the optical axis may change relative to an image axis of the image sensor. Hence, it may be desirable to both adjust the spacing between the lens barrel and the image sensor in the z-direction and adjust the orientation of the optical axis relative to the image axis of the image sensor.

For example, the distance between the lens barrel (e.g., and thus the lenses) and the image sensor (e.g., the spacing in the z-direction) may be adjusted by threading the lens barrel into the holder. The further the lens barrel is threaded into the holder, the smaller the spacing in the z-direction. Adjustments in the z-direction may substantially improve the image quality of the camera.

In some embodiments, the optical system may both adjust the spacing between the lens barrel and the image sensor in the z-direction and, independently of the spacing adjustment, adjust the orientation of the optical axis relative to the image axis of the image sensor. In at least one embodiment, at least one degree of freedom may be added to the optical system to make independent adjustment in the z-direction and $\theta_z$-direction possible. In at least one embodiment, the ability to make independent adjustments in the z-direction and $\theta_z$-direction may provide significantly improved image quality compared to an optical system that is only adjustable in the z-direction without the costs associated with a precision adjustment system.

Referring now to FIG. 1, a conceptual drawing of an embodiment of a mobile device 100 is shown. The mobile device 100 (e.g., a smart phone and/or tablet) may include one or more optical systems 101.

The mobile device 100 may include various internal components. For example, a processor, memory, battery, transceiver, additional optical systems, other internal components, or combinations thereof may be associated with the mobile device 100.

The mobile device 100 may include a display 102. The display 102 may display various pieces of information to a user via, for example, a graphical user interface.

The mobile device 100 may include an input 103. The input 103 may communicate with the mobile device 100 to control what is displayed on the display 102. For example, the input 103 may be a start button (e.g., a start button on a smart phone and/or tablet). In some embodiments, the display 102 may also act as an input. For example, the display 102 may include touch sensors that facilitate user input with the mobile device 100.

The mobile device 100 is illustrated with a single optical system 101. The optical system 101 may interact with one or more components of the mobile device 100. For example the optical system 101 may capture images that may be displayed on the display 102. Optical systems may include a camera module. Camera modules may include image sensors capable of capturing light. For example, image sensors may include a visible light sensor, an infrared light sensor, other sensors, or combinations thereof.

Figure 2:
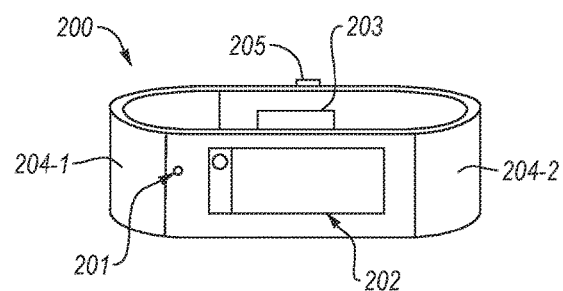
FIG. 2 is a conceptual drawing of an embodiment of a watch-type wearable device.

FIG. 2 is a conceptual drawing of an embodiment of a watch-type wearable device 200. The wearable device 200 is illustrated as a watch-type wearable device. The wearable device 200 may include one or more optical systems 201.

The wearable device 200 may include a display 202 that may display information and/or act as an input (similar to input 103 and/or display 102).

The wearable device 200 may include an input 203. The input 203 may be used to interact with a user. In the present embodiment, the input 203 may be used to measure a user's heart rate. In some embodiments, the input 203 may otherwise interact with a user.

The wearable device 200 may include a first strap 204-1 and a second strap 204-2. The first and second straps 204-1, 204-2 may connect together using a clasp 205.

The wearable device 200 is illustrated with a single optical system 201. The optical system 201 may interact with one or more components of the wearable device 200. For example the optical system 201 may capture images that may be displayed on the display 202.

Figure 3:
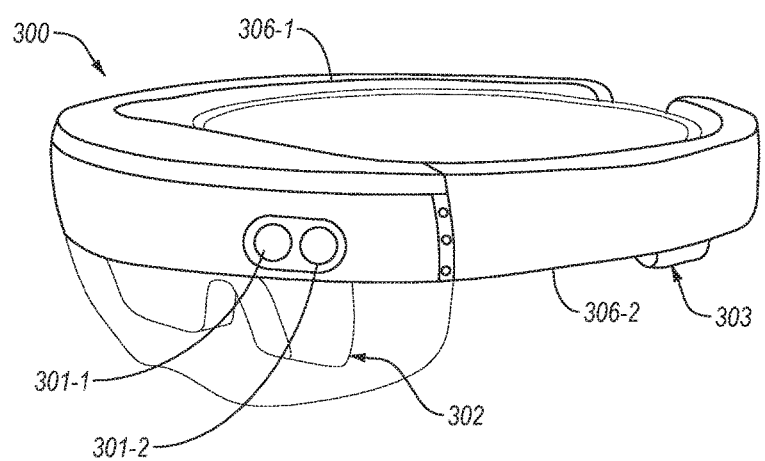
FIG. 3 is a conceptual drawing of an embodiment of a head-worn wearable device.

FIG. 3 is a conceptual drawing of an embodiment of a head-worn wearable device 300. The wearable device 300 may include one or more optical systems 301. Although the wearable devices 200, 300 described in FIGS. 2 and 3 include a watch-type (FIG. 2) and a head-worn (FIG. 3) wearable devices, other wearable devices and/or other devices (e.g., optical accessories, security cameras, and automobile rear view cameras) with an optical system (e.g., optical systems 101, 201, 301) may also be used.

The wearable device 300 may include a display 302 that may display information (similar to displays 102, 202). The display 302 may act as an input (similar to inputs 103, 203).

The wearable device 300 may include an input 303 that may be used to interact with a user. In the present embodiment, the input 303 may be a microphone that may be used to execute voice-based and/or other commands. In some embodiments, the input 303 may otherwise interact with a user.

The wearable device 300 may include a first earpiece 306-1 and a second earpiece 306-2. The first and second earpieces 306-1, 306-2 may support the wearable device 300.

The wearable device 300 may include a plurality of optical systems 301. In the present embodiment, the wearable device 300 includes two optical systems 301-1, 301-2. The optical systems 301-1, 301-2 may be similar to the optical systems 101, 201 described in connection with FIGS. 1 and 2.

In one example, the first optical system 301-1 includes an infrared sensor and the second optical system 301-2 includes a visible light sensor. In a further example, more or fewer optical systems 301 with the same or different image sensors may be used.

Figure 4:
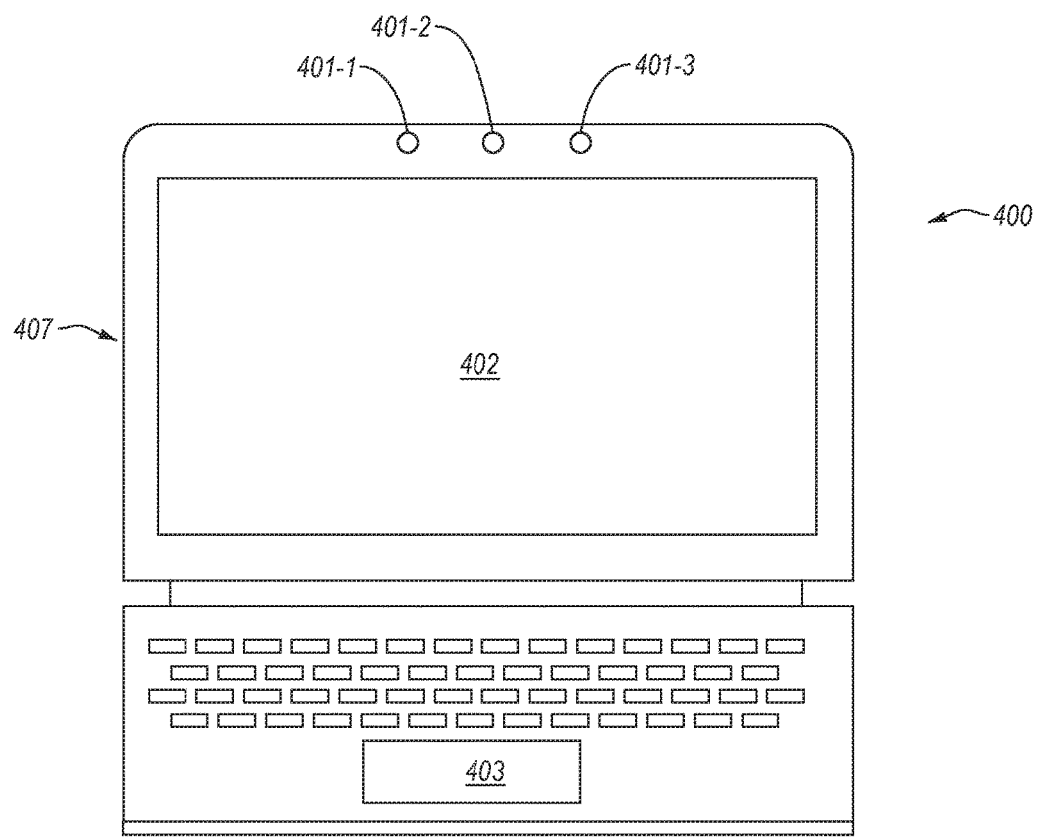
FIG. 4 is a conceptual drawing of an embodiment of a computing device.

FIG. 4 is a conceptual drawing of an embodiment of a computing device 400. The computing device 400 may include one or more optical systems 401. The computing device 400 is illustrated as a laptop-type computing device. In other embodiments, the computing device 400 may be a desktop computing device with an attached monitor, may be a gaming system with an attached monitor and/or attached peripherals, or may be another computing device.

The computing device 400 may include an input device 403 that may be used to interact with a user. The input device 403 may include a keyboard, mouse, trackpad, other input, or combinations thereof.

The computing device 400 may include a monitor 407. The monitor 407 may be attached to an input device 403. In other embodiments, the monitor 407 may be physically detached, but in electronic communication with the input device 403. The monitor 407 may include a display 402. The display 402 may display information (e.g., in a standard monitor) and/or act as an input (e.g., in a touch screen monitor similar to inputs 103, 203 and/or displays 102, 202).

The monitor 407 may include one or more optical systems 401. In another example, a portion of a peripheral may include one or more optical systems 401.

In the present embodiment, the computing device 400 includes optical systems 401-1, 401-2, 401-3. The optical systems 401 may be similar to the optical systems 101, 201, 301 described in connection with FIGS. 1-3. For example, the optical systems 401 may capture images that may be displayed on a display 402, whether on the monitor 407 or another component connected to the computing device 400.

In one example, the first optical system 401-1 includes an infrared sensor, the second optical system 401-2 includes a visible light sensor, and the third optical system 401-3 includes a depth sensor. In a further example, more or fewer optical systems 401 with the same or different image sensors may be used.

Figure 5:
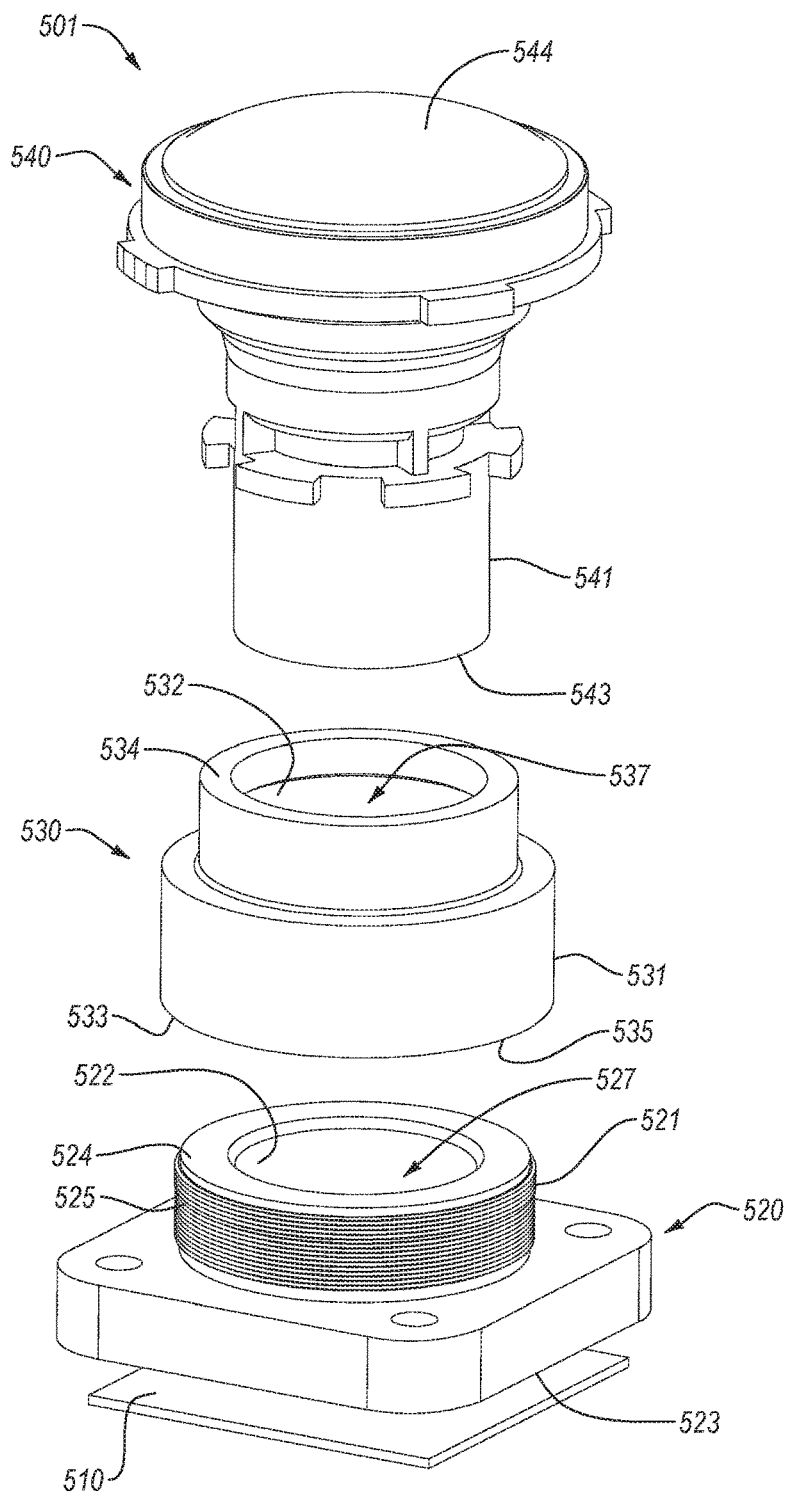
FIG. 5 is an exploded, isometric assembly view of an embodiment of an optical system.
Figures 1, 5:
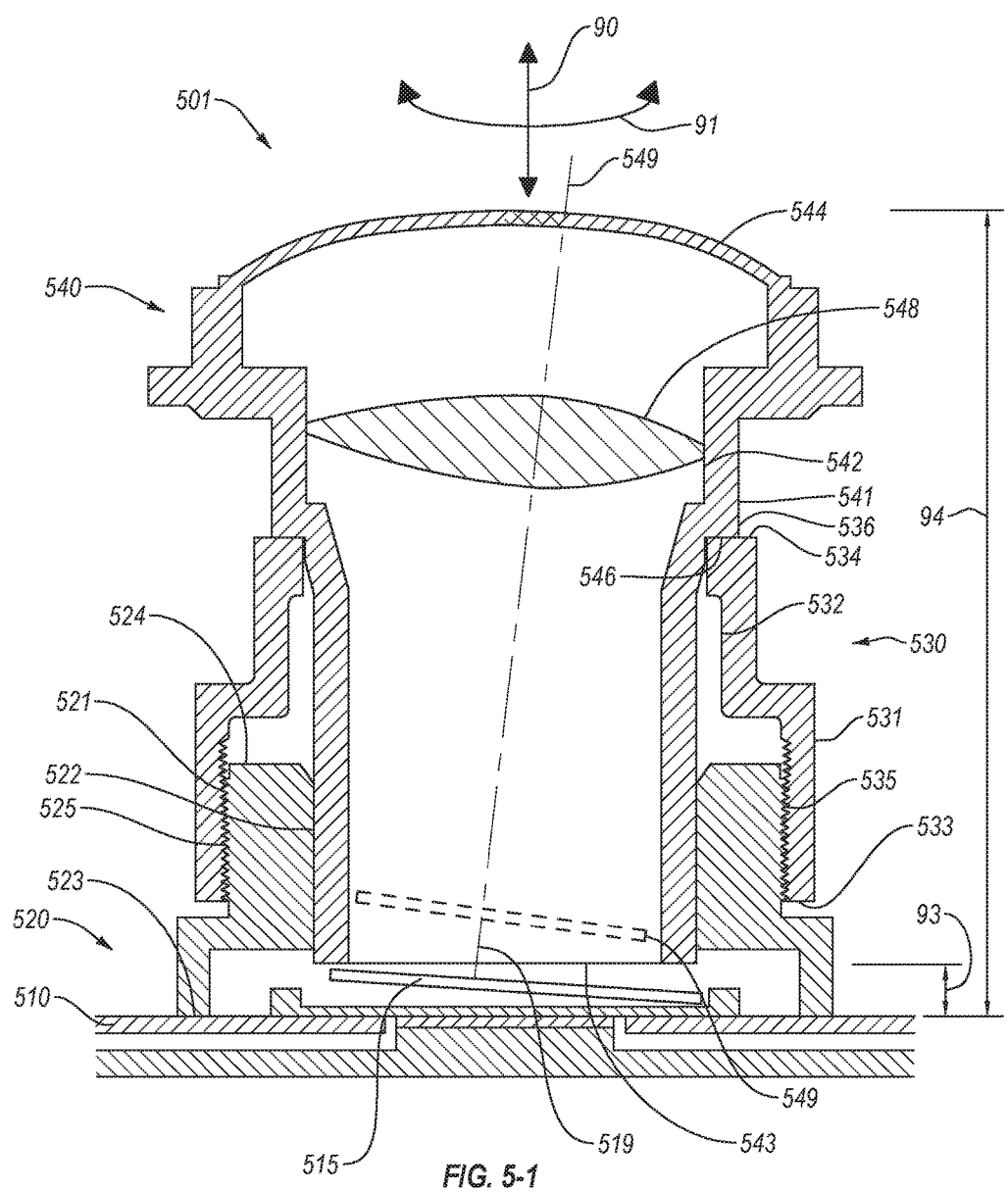

Referring now to FIGS. 5 and 5-1, FIG. 5 is an exploded, isometric assembly view of an embodiment of an optical system 501 and FIG. 5-1 is a cross-sectional, side view of the embodiment of an optical system 501 shown in FIG. 5. The optical system 501 may be incorporated into any of the optical systems 101, 201, 301, 401 described above in connection with FIGS. 1-4.

The optical system 501 may include a base 510 and an image sensor 515. The base 510 may include a printed circuit board assembly (PCBA). The image sensor 515 may be mounted to the base 510. For example, the image sensor 515 may be die-bonded and/or wire-bonded to the base 510. The image sensor 515 has an image axis 519.

The optical system 501 may include various alignment components. As shown in FIGS. 5 and 5-1, the optical system 501 includes three alignment components: a holder 520, a collar 530, and a lens barrel 540.

The holder 520 includes an outer surface 521, an inner surface 522, a lower surface 523 (e.g., a bottom surface), and an upper surface 524 (e.g., a top surface). The outer surface 521 and the inner surface 522 extend between the lower surface 523 and the upper surface 524. The outer surface 521 and the inner surface 522 both abut the lower surface 523 and the upper surface 524.

The holder 520 may be fixed, directly or indirectly, to the base 510. For example, the holder 520 may be mechanically attached to the base 510 using, for example, adhesives, threads, rivets, a snap fit, an interference fit, other mechanical attachment mechanisms, or combinations thereof.

The collar 530 includes an outer surface 531, an inner surface 532, a lower surface 533 (e.g., a bottom surface), and an upper surface 534 (e.g., a top surface). The outer surface 531 and the inner surface 532 extend between the lower surface 533 and the upper surface 534. The outer surface 531 and the inner surface 532 both abut the lower surface 533 and the upper surface 534.

As shown in FIGS. 5 and 5-1, the collar 530 may be inserted through an opening 527 of and threaded into the holder 520. For example, the holder 520 and the collar 530 may be coaxial. The collar 530 may include one or more stops. As shown, the collar 530 includes a stop that may limit the motion of the lens barrel 540 in the z-direction 90. In some embodiments, the stop may only limit motion of the lens barrel 540 in the a-direction. In the present embodiment, the stop is the upper surface 534 of the collar.

The lens barrel 540 includes an outer surface 541, an inner surface 542, a lower surface 543 (e.g., a bottom surface), and an upper surface 544 (e.g., a top surface). The outer surface 541 and the inner surface 542 extend between the lower surface 543 and the upper surface 544. The outer surface 541 and the inner surface 542 both abut the lower surface 543 and the upper surface 544. The lens barrel 540 is illustrated with a single lens 548, but the lens barrel 540 may include a plurality of lenses.

The lens barrel 540 has (in conjunction with one or more lenses) an optical axis 549. The optical axis 549 may be a line along which there is some degree of rotational symmetry in the lens barrel 540. For example, as shown in FIG. 5-1, the optical axis 549 runs through the lens 548. In embodiments with multiple lenses, the optical axis 549 would result from the combination of individual optical axes of each lens 548.

As shown in FIGS. 5 and 5-1, the lens barrel 540 may be inserted through an opening 537 of the collar 530. For example, the collar 530 and the lens barrel 540 may be coaxial. The lens barrel 540 may include one or more stops 546. As shown, the lens barrel 540 includes a stop 546 that may limit the motion of the lens barrel 540 in the z-direction 90. The stop 546 on the lens barrel 540 (e.g., bottom surface 543) may abut the stop 536 on the collar 530 (e.g., top surface 534).

Two of the three alignment components (e.g., two of the holder 520, collar 530, and lens barrel 540) may be mechanically connected. For example, two of the three alignment components may be threaded together. As shown in FIGS. 5 and 5-1, the holder 520 includes threads 525 on the outer surface 521 and the collar 530 includes threads 535 on the inner surface 532.

The mechanical connection between two of the three alignment components may be used to adjust the distance 93 between the lens barrel 540 and the base 510 in the z-direction 90. The z-direction 90 may also be the longitudinal axis of the holder 520, the collar 530, the lens barrel 540, or combinations thereof. For example, for a threaded connection between the holder 520 and the collar 530, rotation of the collar 530 within the holder 520 will adjust the distance 94 between the upper surface 544 of the lens barrel 540 and the base 510.

The remaining alignment component may be aligned about the $\theta_z$ axis 91 by rotating the alignment component until the optical axis 549 of the lens barrel 540 is aligned with the image axis 519 of the image sensor 515, as shown in FIG. 5-1. Aligning the optical axis 549 of the lens barrel 540 with the image axis 519 of the image sensor 515 may mean aligning the two axes 549, 519 so that they are coaxial, as shown. In another example, aligning the axes 549, 519 may mean aligning the axes 549, 519 so that they are approximately coaxial. In a further example, aligning the axes 549, 519 may mean rotating the optical axis of the lens barrel 540 relative to the image axis 519 of the image sensor. In a yet further example, aligning the axes 549, 519 may mean aligning the axes 549, 519 so that they intersect (e.g., if the axes are oriented at different angles to the longitudinal axis 90).

Once the remaining alignment component is aligned about the $\theta_z$-axis 91, it may be separately connected to another of the alignment components. For example, as shown in FIGS. 5 and 5-1, the lens barrel 540 may be connected to the collar 530. The lens barrel 540 and the collar 530 may be connected via, for example, adhesives.

Figure 6:
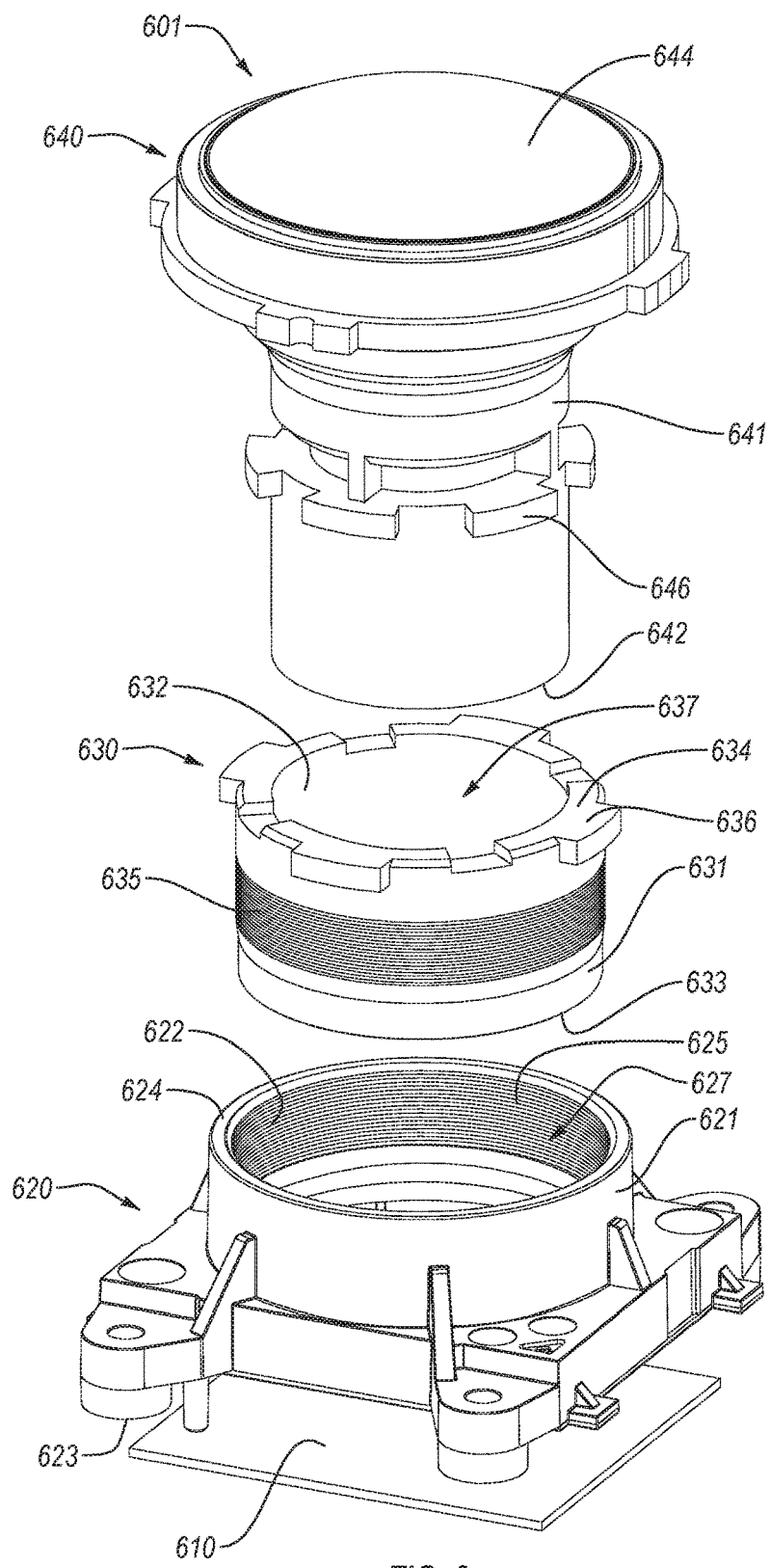
FIG. 6 is an exploded, isometric assembly view of another embodiment of an optical system.
Figures 1, 6:
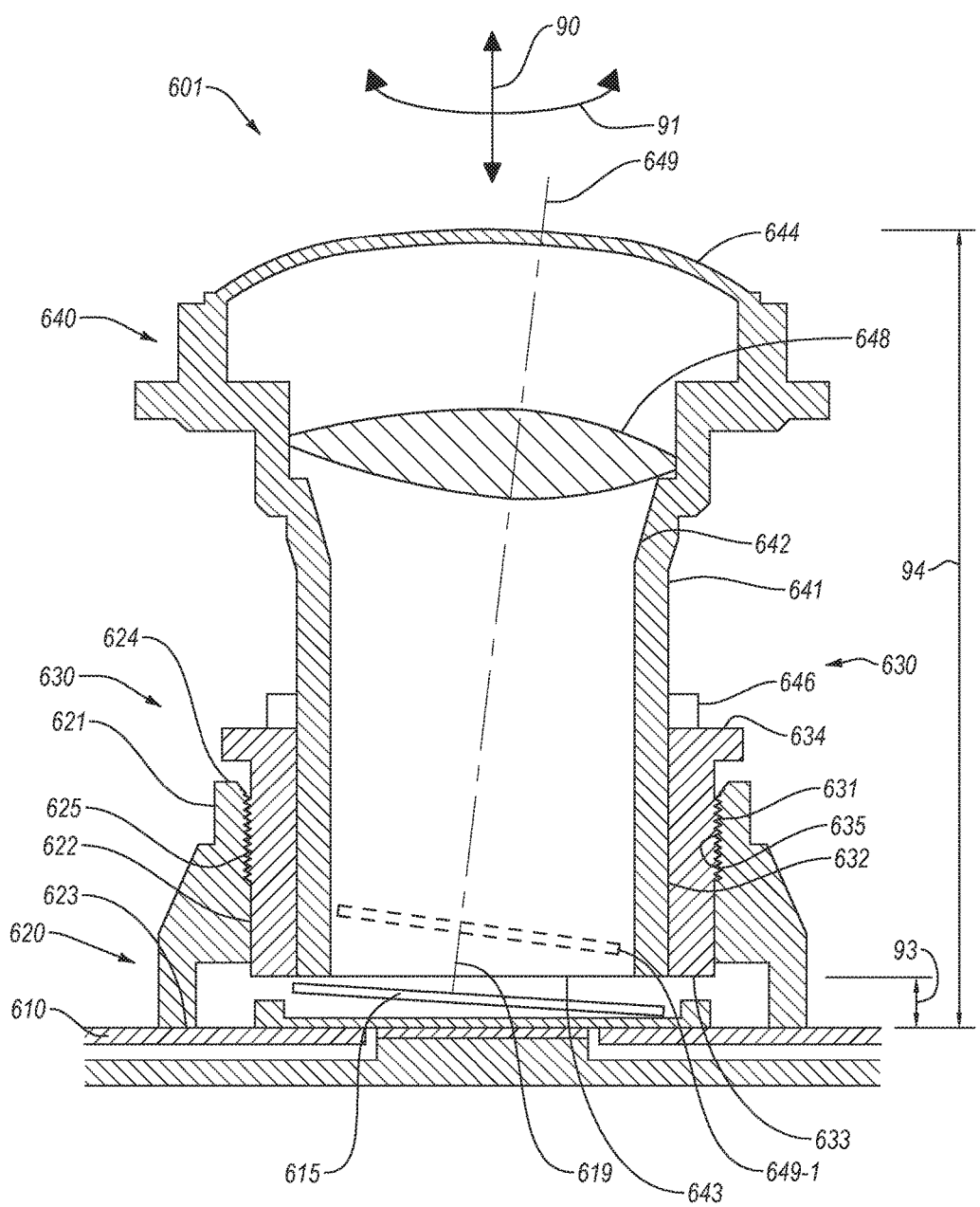

Referring now to FIGS. 6 and 6-1, FIG. 6 is an exploded, isometric assembly view of another embodiment of an optical system 601 and FIG. 6-1 is a cross-sectional, side view of the embodiment of an optical system 601 shown in FIG. 6. The optical system 601 may be incorporated into any of the optical systems 101, 201, 301, 401 described above in connection with FIGS. 1-4 and/or one or more components of the optical system 601 may be incorporated into any of the optical systems described herein (e.g., optical systems 501, 701, 801).

The optical system 601 may include a base 610 and an image sensor 615. The base 610 may include a printed circuit board assembly (PCBA). The image sensor 615 may be mounted to the base 610. The image sensor 615 may include an image axis 619.

The optical system 601 may include various alignment components. As shown in FIGS. 6 and 6-1, the optical system 601 includes three alignment components: a holder 620, a collar 630, and a lens barrel 640.

The holder 620, the collar 630, and the lens barrel 640 may be similar to the holder 520, collar 530, and the lens barrel 540 shown in FIGS. 5 and 5-1. For example, the holder 620 may include an outer surface 621, an inner surface 622, a lower surface 623, and an upper surface 624; the collar 630 may include an outer surface 631, an inner surface 632, a lower surface 633, and an upper surface 634; and the lens barrel 640 may include an outer surface 641, an inner surface 642, a lower surface 643, and an upper surface 644. The outer surfaces 621, 631, 641 and the inner surfaces 622, 632, 642 may extend between the lower surfaces 623, 633, 643 and the upper surfaces 624, 634, 644, respectively. The outer surfaces 621, 631, 641 and the inner surfaces 622, 632, 642 may abut the lower surfaces 623, 633, 643 and abut the upper surfaces 624, 634, 644, respectively.

The holder 620, collar 630, lens barrel 640, or combinations thereof may include one or more stops 626, 636, 646. The upper surface 634 of the collar 630 may act as a stop that may limit the motion of the lens barrel 640 in the z-direction 90. The lens barrel 640 may include a stop 646 that may abut the stop (e.g., the upper surface 634) of the collar 630.

As shown in FIGS. 6 and 6-1, the holder 620 may be fixed, directly or indirectly, to the base 610. The collar 630 may be inserted through an opening 627 of the holder 620. The lens barrel 640 may be inserted through an opening 637 of the collar 630.

The lens barrel 640 is illustrated with a single lens 648, but the lens barrel 640 may include a plurality of lenses. The lens barrel 640 has (in conjunction with one or more lenses) an optical axis 649.

The holder 620 and collar 630 may be mechanically connected. For example, as shown in FIGS. 6 and 6-1, the holder 620 includes threads 625 on the inner surface 622 and the collar 630 includes threads 635 on the outer surface 631.

The mechanical connection between the holder 620 and the collar 630 may be used to adjust the distance 93 between the lower surface 633 of the collar 630 and the base 610 in the z-direction 90. For example, for a threaded connection between the holder 620 and the collar 630, rotation of the collar 630 within the holder 620 will adjust the distance 94 between the upper surface 644 of the lens barrel 640 and the base 610.

The lens barrel 640 may be aligned about the $\theta_z$ axis 91 by rotating the lens barrel 640 until the optical axis 649 of the lens barrel 640 is aligned with the image axis 619 of the image sensor 615, as shown in FIG. 6-1.

Once the lens barrel 640 is aligned about the $\theta_z$-axis 91, it may be connected to the collar 630. The lens barrel 640 and the collar 630 may be connected via, for example, adhesives.

Figure 7:
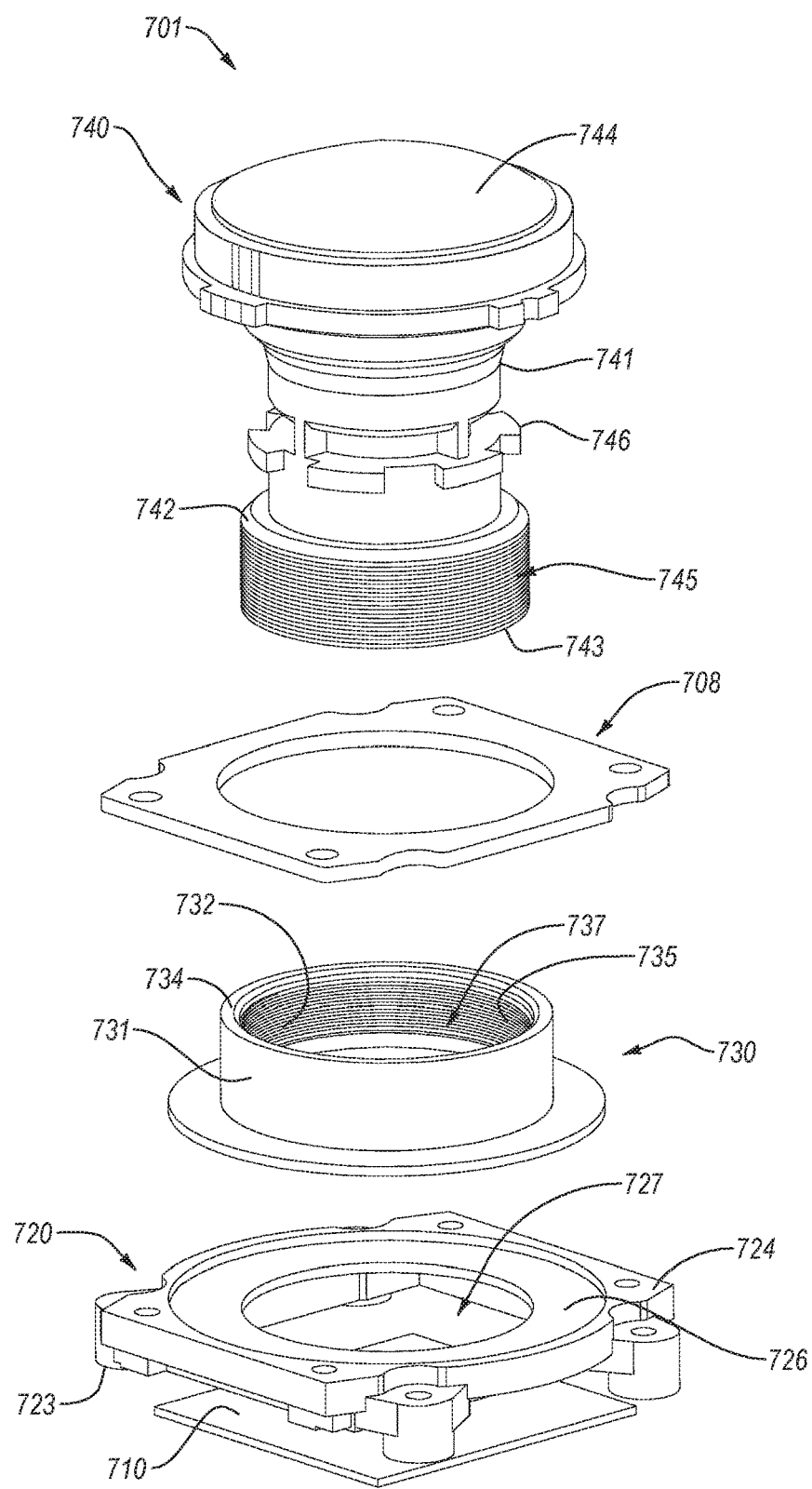
FIG. 7 is an exploded, isometric assembly view of a further embodiment of an optical system.
Figures 1, 7:
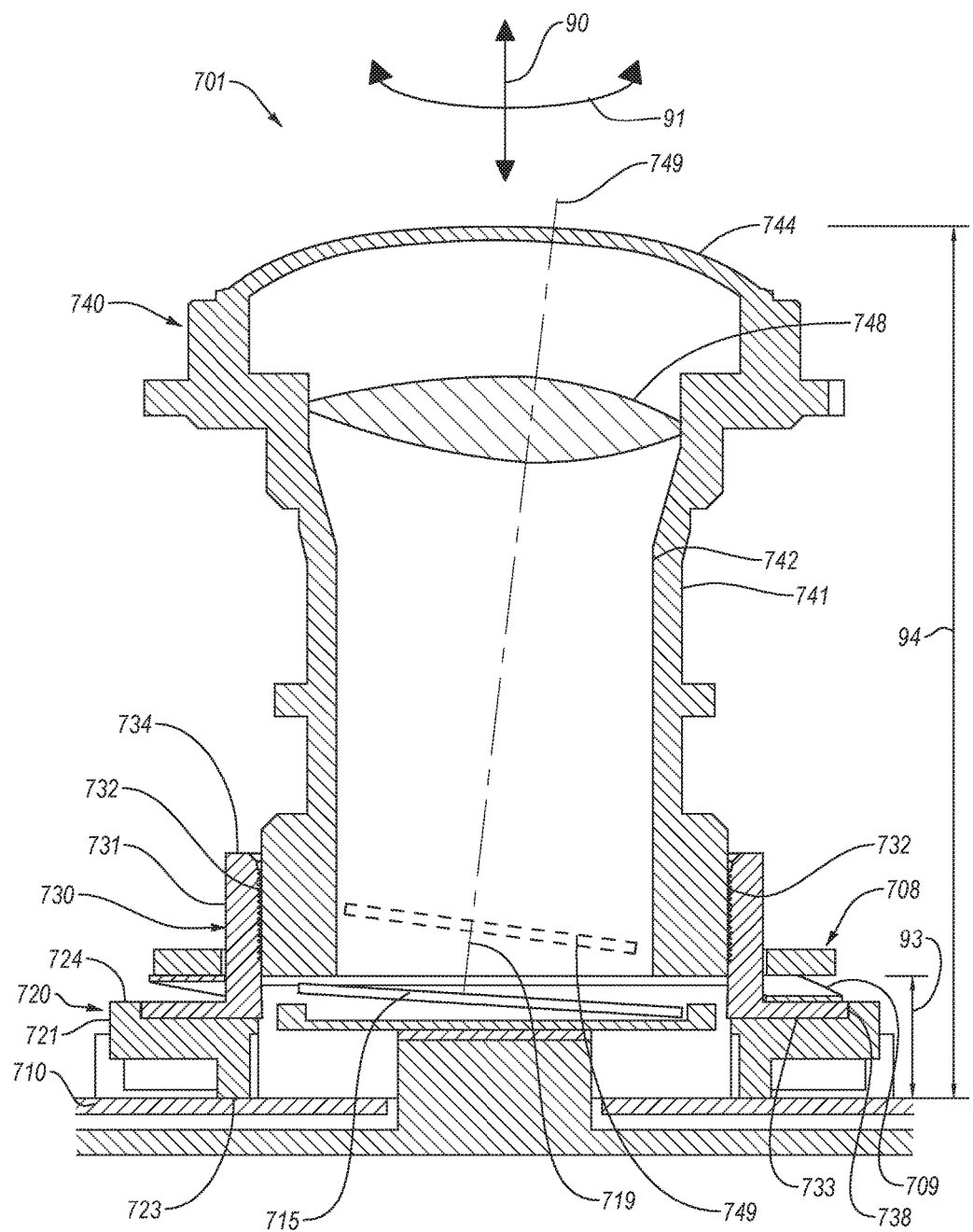

Referring now to FIGS. 7 and 7-1, FIG. 7 is an exploded, isometric assembly view of another embodiment of an optical system 701 and FIG. 7-1 is a cross-sectional, side view of the embodiment of an optical system 701 shown in FIG. 7. The optical system 701 may be incorporated into any of the optical systems 101, 201, 301, 401 described above in connection with FIGS. 1-4 and/or one or more components of the optical system 701 may be incorporated into any of the optical systems described herein (e.g., optical systems 501, 601, 801).

The optical system 701 may be similar to the optical systems 501, 601 described in connection with FIGS. 5 and 6. The optical system 701 is shown as being structurally similar to the optical system 601 of FIGS. 6 and 6-1. For example, the optical system 701 may include a base 710, an image sensor 715, and various alignment components; a holder 720, a collar 730, and a lens barrel 740, which may include surfaces (e.g., outer, inner, upper, and lower surfaces), stops, and the like. Like components and portions of components have been labeled with similar numbering for ease of description.

The holder 720, collar 730, lens barrel 740, or combinations thereof may include one or more stops 726, 736, 746. As shown in FIGS. 7 and 7-1, the upper surface 724 of the holder 720 may act as a stop that may limit the motion of the collar 730 in the z-direction 90.

The optical system 701 may differ from the optical system 601. For example, the collar 730 and the lens barrel 740 may be mechanically connected, rather than the holder 620 and the collar 630. For example, as shown in FIGS. 7 and 7-1, the collar 730 includes threads 735 on the inner surface 732 and the lens barrel 740 includes threads 745 on the outer surface 741.

The mechanical connection between the collar 730 and the lens barrel 740 may be similar to the mechanical connection between the holder 620 and the collar 630 in FIGS. 6 and 6-1. For example, the mechanical connection may be used to adjust the distance 93 between the lower surface 743 of the lens barrel 740 and the base 710 in the z-direction 90. For example, for a threaded connection between the collar 730 and the lens barrel 740, rotation of the lens barrel 740 within the collar 730 will adjust the distance 94 between the lower surface 743 of the lens barrel 740 and the base 710.

The lens barrel 740 may be aligned about the $\theta_z$ axis 91 by rotating the collar 730 until the optical axis 749 of the lens barrel 740 is aligned with an image axis 719 of the image sensor 715, as shown in FIG. 7-1. Rotating the collar 730 may also rotate the lens barrel 740. As shown in FIG. 7, a lock 708 with a spring 709 may fix the collar 730 to the holder 720. For example, the collar 730 may include a flange 738. The upper surface (not labeled) of the flange 738 may abut a lower surface (not labeled) of the lock 708 so that a lower surface (not labeled) of the flange 738 abuts the upper surface 724 of the holder 720. In other embodiments, the collar 730 and the holder 720 may be connected via, for example, adhesives, as shown above. In further embodiments, the collar 730 and the holder 720 may be connected via both a mechanical connection and adhesives.

Once the lens barrel 740 is aligned about the $\theta_z$-axis 91, the collar may be connected to the holder 720. The collar 730 and the holder 720 may be connected via, for example, adhesives. As shown in FIG. 7-1, the image sensor 715 may be elevated above the base 710. In other embodiments, the image sensor 715 may be directly attached to the base 710.

Figure 8:
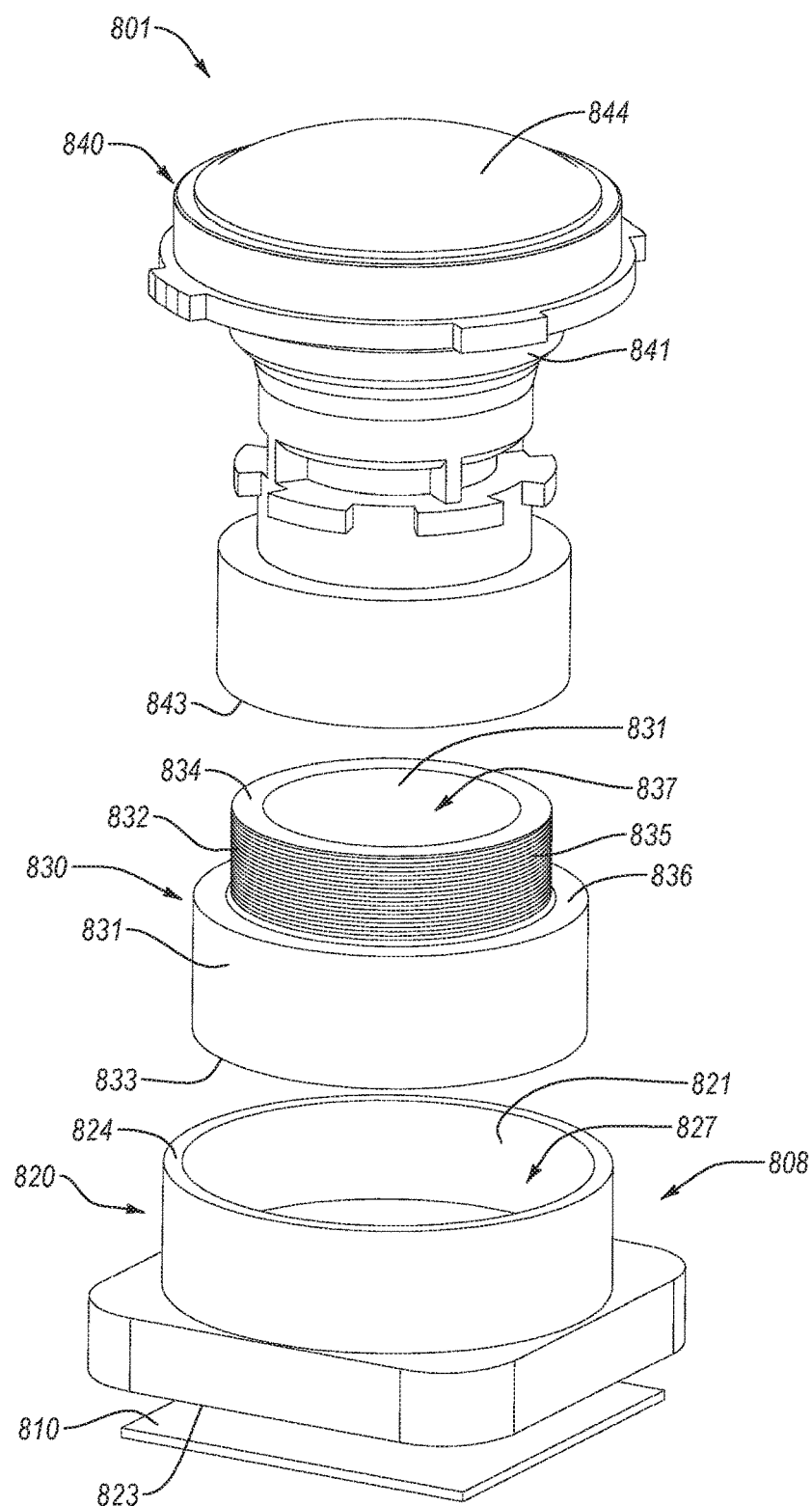
FIG. 8 is an exploded, isometric assembly view of a yet further embodiment of an optical system.
Figures 1, 8:
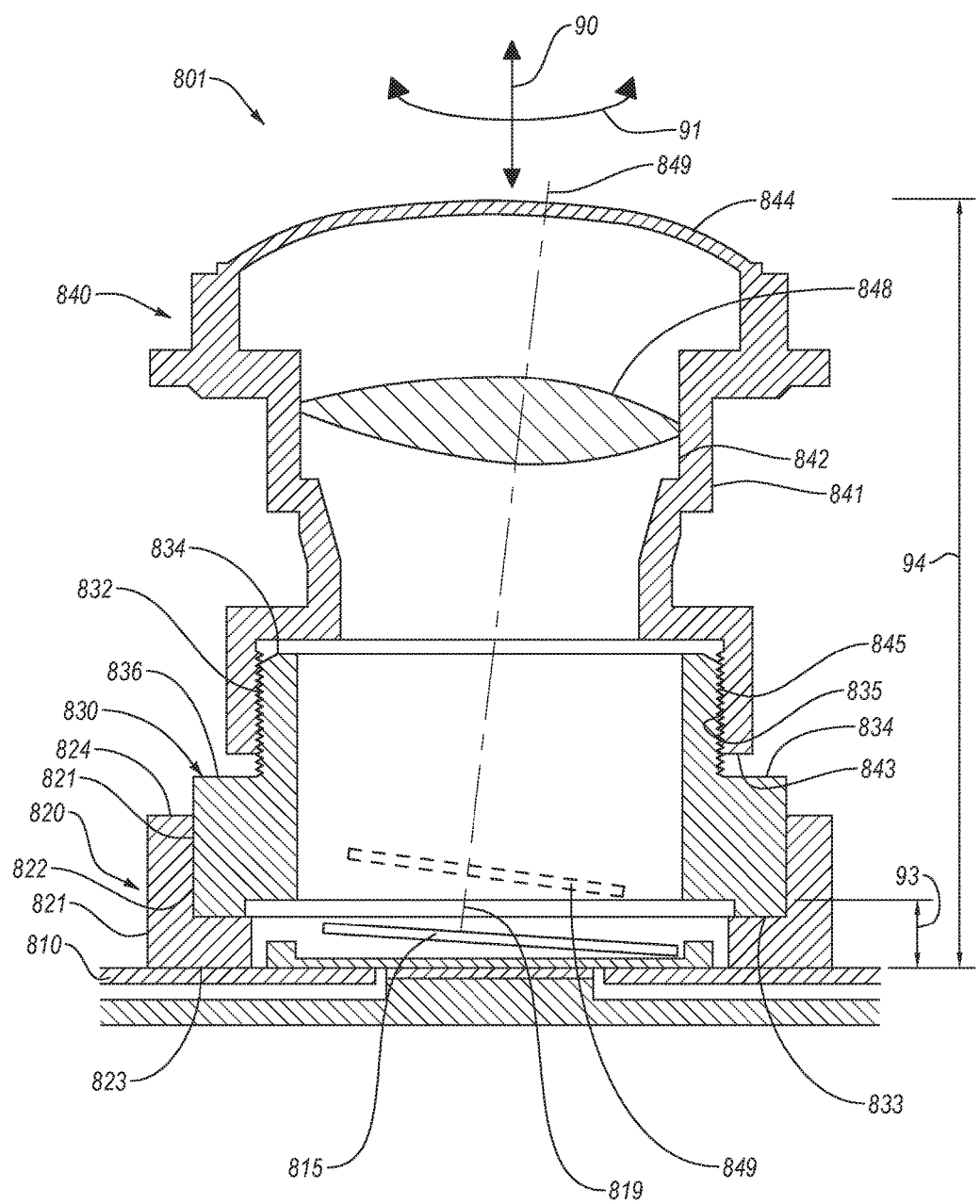

Referring now to FIGS. 8 and 8-1, FIG. 8 is an exploded, isometric assembly view of another embodiment of an optical system 801 and FIG. 8-1 is a cross-sectional, side view of the embodiment of an optical system 801 shown in FIG. 8. The optical system 801 may be incorporated into any of the optical systems 101, 201, 301, 401 described above in connection with FIGS. 1-4 and/or one or more components of the optical system 801 may be incorporated into any of the optical systems described herein (e.g., optical systems 501, 601, 701).

The optical system 801 may be similar to the optical systems 501, 601, 701 described in connection with FIGS. 5-7. The optical system 801 is shown as having similar components as the optical system 601 of FIGS. 6 and 6-1. For example, the optical system 801 may include a base 810, an image sensor 815, and various alignment components; a holder 820, a collar 830, and a lens barrel 840, which may include surfaces (e.g., outer, inner, upper, and lower surfaces), stops, and the like. Like components and portions of components have been labeled with similar numbering for ease of description.

The holder 820, collar 830, lens barrel 840, or combinations thereof may include one or more stops 836. The upper surface 834 of the collar 830 may act as a stop that may limit the motion of the lens barrel 840 in the z-direction 90. The lens barrel 840 may include a stop 846 that may abut the stop (e.g., the upper surface 834) of the collar 830.

The optical system 801 may be similar to the optical system 701. For example, the collar 830 and the lens barrel 840 may be mechanically connected. For example, as shown in FIGS. 8 and 8-1, the collar 830 includes threads 835 on the outer surface 831 and the lens barrel 840 includes threads 845 on the inner surface 842.

The mechanical connection between the collar 830 and the lens barrel 840 may be similar to the mechanical connection between the holder 620 and the collar 630 in FIGS. 6 and 6-1 and between the collar 730 and lens barrel 740 in FIGS. 7 and 7-1. For example, for a threaded connection between the collar 830 and the lens barrel 840, rotation of the lens barrel 840 within the collar 830 may adjust the distance 94 between the upper surface 844 of the lens barrel 840 and the base 810.

The lens barrel 840 may be aligned about the $\theta_z$ axis 91 by rotating the collar 830 about the holder 820 until the optical axis 849 of the lens barrel 840 is aligned with an image axis 819 of the image sensor 815, as shown in FIG. 8-1. Rotating the lens barrel 840 may also rotate the collar 830. For example, the lens barrel 840 may be affixed (e.g., by adhesives) to the collar 830 after being threaded into the collar 830. Once the lens barrel 840 is aligned about the $\theta_z$-axis 91, the collar may be affixed to the holder 820.

More or fewer alignment components may be included in the embodiments described above. For example, additional alignment components may be used. Multiple components may make up an alignment components. For example, a holder may be separated into multiple components such that one component is connected to the base and another component is connected to the collar.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical system, comprising:
    a base;
    an image sensor fixed to the base;
    a holder fixed to the base about the image sensor, the holder including threads;
    a collar oriented about the image sensor and the holder, the collar including threads that mechanically attach to the threads of the holder; and
    a lens barrel oriented about the image sensor, the holder, and the collar, the lens barrel including at least one lens oriented therein, the at least one lens located above an uppermost surface of the collar, the lens barrel being connected to the collar via a non-threaded mechanical connection.

2. The optical system of claim 1, wherein the holder has external threads and the collar has internal threads.

3. The optical system of claim 1, wherein the holder has internal threads on an internal periphery of the holder and the collar has external threads on an external periphery of the collar.

4. The optical system of claim 1, wherein the lens barrel includes a stop that abuts an uppermost surface of the collar.

5. The optical system of claim 1, wherein the lens barrel is fixed to the collar by an adhesive below the at least one lens.

6. The optical system of claim 1, wherein an optical axis of the lens barrel intersects an image axis of the image sensor.

7. The optical system of claim 1, wherein an optical axis of the lens barrel is coaxial with an image axis of the image sensor.

8. An optical system, comprising:
    a base;
    an image sensor fixed to the base;
    a holder fixed to the base about the image sensor;
    a collar oriented about the image sensor and the holder, the collar including threads, the collar being connected to the holder via a non-threaded mechanical connection; and
    a lens barrel oriented about the image sensor, the holder, and the collar, the lens barrel including at least one lens oriented therein, the at least one lens located above an uppermost surface of the collar, the lens barrel including threads that mechanically attach to the threads of the collar, wherein the lens barrel includes a stop that abuts an upper surface of the collar.

9. The optical system of claim 8, wherein the lens barrel has external threads and the collar has internal threads.

10. The optical system of claim 8, wherein the lens barrel has internal threads and the collar has external threads.

11. The optical system of claim 8, wherein an optical axis of the lens barrel intersects an image axis of the image sensor.

12. The optical system of claim 8, wherein an optical axis of the lens barrel is coaxial with an image axis of the image sensor.

13. The optical system of claim 8, wherein the lens barrel is fixed to the collar.

14. The optical system of claim 8, further comprising a lock that abuts the collar to limit longitudinal motion of the collar relative to the holder.

15. A camera module, comprising:
a base;
an image sensor fixed to the base;
a holder fixed to the base about the image sensor;
a collar oriented about the image sensor and the holder; and
a lens barrel oriented about the image sensor, the holder, and the collar, the lens barrel including at least one lens oriented therein, the at least one lens located above an uppermost surface of the collar, only two of the holder, the collar, and the lens barrel including threads to mechanically attach, wherein the lens barrel includes a stop that abuts an upper surface of the collar.

16. The camera module of claim 15, wherein the lens barrel and the collar have threads and the collar includes a stop that abuts an upper surface of the holder, the collar affixed to the holder.

17. The camera module of claim 15, wherein the holder and the collar have threads and the lens barrel is affixed to the collar.

18. The camera module of claim 15, wherein the image sensor is capable of capturing visible light.

19. The camera module of claim 15, wherein the image sensor is capable of capturing infrared light.

20. The optical system of claim 1, wherein the image sensor is capable of capturing infrared light.

* * * * *